(12) United States Patent
Blanchard et al.

(10) Patent No.: US 10,301,972 B2
(45) Date of Patent: May 28, 2019

(54) INTERMEDIATE CASING FOR A TURBOMACHINE TURBINE

(71) Applicant: Safran Aircraft Engines, Paris (FR)

(72) Inventors: Stéphane Pierre Guillaume Blanchard, Moissy-Cramayel (FR); Hélène Myriam Condat, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 38 days.

(21) Appl. No.: 15/695,725

(22) Filed: Sep. 5, 2017

(65) Prior Publication Data

US 2018/0066540 A1 Mar. 8, 2018

(30) Foreign Application Priority Data

Sep. 6, 2016 (FR) ...................... 16 58263

(51) Int. Cl.
*F01D 25/24* (2006.01)
*F01D 25/28* (2006.01)
*F01D 25/16* (2006.01)

(52) U.S. Cl.
CPC .......... *F01D 25/243* (2013.01); *F01D 25/16* (2013.01); *F01D 25/162* (2013.01); *F01D 25/28* (2013.01); *F05D 2220/323* (2013.01); *F05D 2230/53* (2013.01); *F05D 2240/14* (2013.01); *F05D 2240/90* (2013.01); *Y02T 50/671* (2013.01)

(58) Field of Classification Search
CPC ...... F01D 25/16; F01D 25/162; F01D 25/243; F01D 25/28; F05D 2220/323; F05D 2240/14; F05D 2240/90
USPC ................................ 415/213.1, 214.1, 219.1
See application file for complete search history.

(56) References Cited

U.S. PATENT DOCUMENTS

| | | | | |
|---|---|---|---|---|
| 2006/0263208 A1* | 11/2006 | Stone | ..................... | F01D 25/243 415/198.1 |
| 2009/0155063 A1* | 6/2009 | Duchatelle | ............. | B64D 27/26 415/198.1 |
| 2012/0219415 A1* | 8/2012 | Seize | ..................... | F01D 25/162 415/214.1 |
| 2015/0226125 A1* | 8/2015 | Petty | ..................... | F01D 25/162 60/796 |
| 2015/0308289 A1* | 10/2015 | Lacroix | ..................... | F01D 9/02 415/214.1 |
| 2015/0345333 A1* | 12/2015 | Dubois | .................. | B64D 29/06 415/214.1 |
| 2016/0017754 A1* | 1/2016 | Kumar | .................. | F01D 25/162 60/805 |
| 2016/0363004 A1* | 12/2016 | Chow | ................... | F01D 25/145 |
| 2017/0241291 A1* | 8/2017 | Boeck | .................. | F01D 11/003 |

* cited by examiner

*Primary Examiner* — Erick R Solis
(74) *Attorney, Agent, or Firm* — Blank Rome LLP

(57) ABSTRACT

A turbine comprising an intermediate casing axially inserted between an upstream high pressure turbine casing and a downstream low pressure turbine casing and comprising an outer annular shroud from which an annular flange radially extends, characterized in that the downstream end of the high pressure turbine casing and the upstream end of the low pressure turbine casing are attached on the radial annular flange of the intermediate casing.

10 Claims, 2 Drawing Sheets

INTERMEDIATE CASING FOR A TURBOMACHINE TURBINE

FIELD OF THE INVENTION

The present invention relates to a turbomachine turbine, and specifically to attaching various casings of such turbine together.

BACKGROUND OF THE INVENTION

A turbine generally comprises several successive casings along the longitudinal axis of the turbine, such casings provide protection to the turbine elements or form flow paths or veins wherein air flows through the turbine.

Such casings are generally annular, extend along the longitudinal axis of the turbine, and have to be perfectly aligned so as to limit disturbances in the air flow, more particularly when the casings form flow paths or veins.

The casings each comprise an annular flange through which they are assembled together by bolting.

In a junction area of the downstream end of the combustion chamber casing with a turbine casing, as schematically illustrated in FIG. 1 which shows a turbomachine 4 turbine 2 of the prior art, the turbomachine comprises a fan disc 6 sucking air towards a downstream low pressure compressor 8, followed by a high pressure compressor 10 which opens into a combustion chamber 12. The combustion chamber 12 opens into a high pressure turbine externally delimited by a high pressure turbine casing 14 followed by a low pressure turbine externally delimited by a low pressure turbine casing 16. The high pressure and low pressure turbine casings 14, 16 are separated by at least one intermediate casing 18 specifically used for fixing the supports 20 of the shaft bearings 22, 24 of the different turbines. Both ends of the intermediate casing 18 comprise a flange 26, 28 radially extending outwards, and whereon the high pressure turbine casing 14 and the low pressure turbine casing 16 are attached.

Besides, a support 30 of the turbine is also attached to one of the two flanges 26, 28.

Such attachment however has a major drawback. An axial and radial shifting of the attachment between the high pressure turbine casing and the intermediate casing will affect the relative position, and thus the coaxiality, of the high pressure turbine casing with the low pressure turbine casing.

Moreover, the positioning of the upstream flange of the low pressure turbine casing has to be very accurate since such flange of the low pressure turbine casing is positioned in a zone where the clearance control ducts are integrated.

An axial misalignment of the casings can then create disturbances in the circulation of the air flow, impacting the efficiency of the turbine, and thus, that of the turbomachine.

Besides, such misalignment can be increased by the deformation, caused by heat, of the casings when the turbine is operating.

A solution would be to eliminate the intermediate casing to attach both turbine casings together, however the presence of such intermediate casing is necessary, specifically to enable attaching the turbine to the aircraft.

SUMMARY OF THE INVENTION

The invention more specifically aims at providing a simple, efficient and economical solution to this problem.

For this purpose, the invention provides a turbine comprising an intermediate casing axially inserted between an upstream high pressure turbine casing and a downstream low pressure turbine casing and comprising an outer annular shroud from which an annular flange extends, characterized in that the downstream end of the high pressure turbine casing and the upstream end of the low pressure turbine casing are attached on the radial annular flange of the intermediate casing.

Attaching the high pressure turbine casing and the low pressure turbine casing on the same flange ensures the coaxiality of both casings. The risk of disturbing the air flow is then reduced.

Advantageously, the downstream end of the high pressure turbine casing comprises a radial annular flange attached to an upstream face of the annular flange of the intermediate casing, and the upstream end of the low pressure turbine casing comprises a radial annular flange attached on a downstream face of the annular flange of the intermediate casing.

The respective flanges of the high pressure turbine casing and of the low pressure turbine casing are then positioned on either side of the flange, which makes it possible to use only one series of bolts, the screws of which go through both turbine casings and the flange. The mass of the turbine is thus lightened and results in a reduction of the energy consumption thereof.

The downstream end of the high pressure turbine casing and/or the upstream end of the low pressure turbine casing preferably bear radially inwards, on the outer annular shroud of the intermediate casing.

Both casings then have a common reference whereon they can bear, which further limits the risks of a poor coaxiality between both turbine casings. Besides, positioning the flange of the low pressure turbine casing outside the outer shroud of the intermediate casing makes it possible to protect the former from the heat and to facilitate clearance control.

According to one embodiment, the intermediate casing comprises a plurality of arms which extend between an inner annular shroud and the outer annular shroud.

Such arms specifically aim at straightening the air flow at the high pressure turbine outlet, and prior to the entering thereof into the low pressure turbine.

The inner and outer annular shrouds can be cylindrical or frustoconical. In a particular embodiment, the inner annular shroud is frustoconical and its section increases in the downstream direction, and the outer annular shroud is cylindrical. The cylindrical surface of the outer annular shroud facilitates the bearing radially inwards of the downstream end of the high pressure turbine casing and the upstream end of the low pressure turbine casing.

The annular flange of the intermediate casing is preferably arranged between the leading edge and the trailing edge of the arms, along the longitudinal axis of the turbine.

This more particularly enables a better transfer of stress to the intermediate casing, and provides a better fixing point on an aircraft, with the arms possibly belonging to the structure and participating in the turbine stiffness.

Besides, the intermediate casing may comprise an upstream annular wall and a downstream annular wall radially formed inside the inner annular shroud and externally connected therewith and respectively carrying a bearing for supporting and guiding the shaft of the high pressure turbine and a bearing for supporting and guiding the shaft of the low pressure turbine.

The intermediate casing can then be used as means for supporting and guiding the shafts of the turbines, which makes it unnecessary to add parts dedicated to supporting and guiding the shafts, with such parts resulting in an increase in the mass of the turbine.

Besides, the intermediate casing may comprise means for fixing the turbine to an aircraft.

This prevents using a dedicated flange or sharing a flange for attaching an adjacent casing. The mass of the turbine thus is not increased and attaching the fixing means or the adjacent casing in case of acceptable manufacturing defect(s) of either one cannot be made impossible.

Advantageously the outer annular shroud, the inner annular shroud, the arms, the fixing means, the upstream annular wall and the downstream annular wall are produced in one single piece, for instance produced in a foundry.

The intermediate casing can thus become a reference part of the turbine, which facilitates the assembling of the turbine, and enhances the assembling quality of the turbine.

The turbine is preferably fixed to an aircraft by bolting the means for fixing on the aircraft.

Attachment by bolts is simply and quickly implemented and is further reversible, thus enabling an easy and quick disassembling of the turbine, specifically for maintenance purposes.

The invention also provides for a turbomachine comprising a turbine as disclosed above.

BRIEF DESCRIPTION OF THE DRAWINGS

The invention will be better understood and further details, characteristics and advantages of the invention will appear upon reading the following description which is a non restrictive example while referring to the appended drawings, wherein.

DETAILED DESCRIPTION OF THE INVENTION

Figure 1:
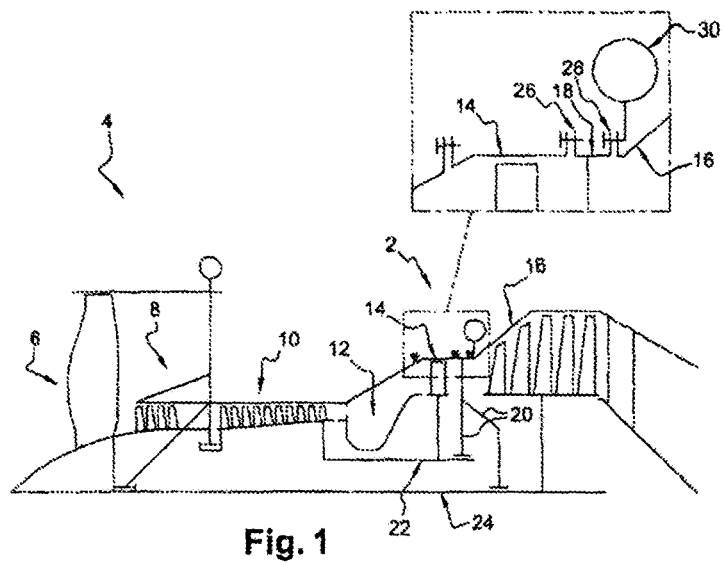
FIG. 1 is a schematic sectional view of a turbomachine of the prior art comprising a turbine, with such figure comprising a detail insert at a larger scale.
Figure 2:
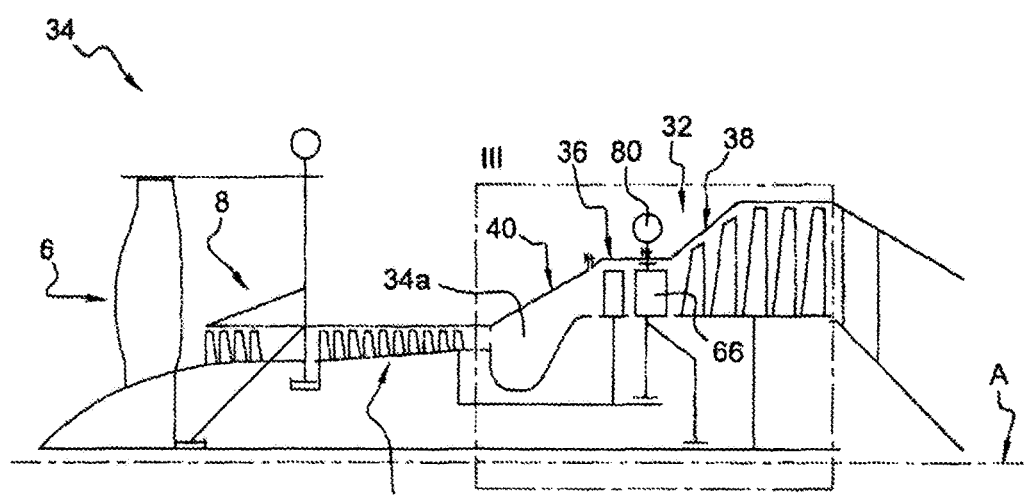
FIG. 2 is a schematic sectional view of a turbomachine comprising a turbine according to the invention.
Figure 3:
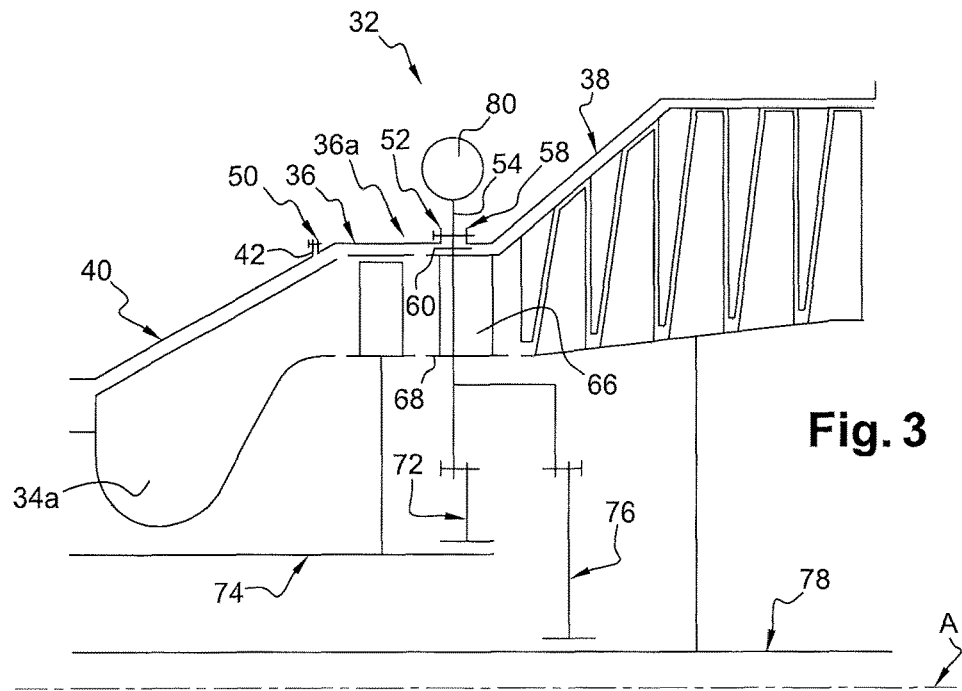
FIG. 3 is a detailed view of the turbine according to insert III of FIG. 2.
Figure 4:
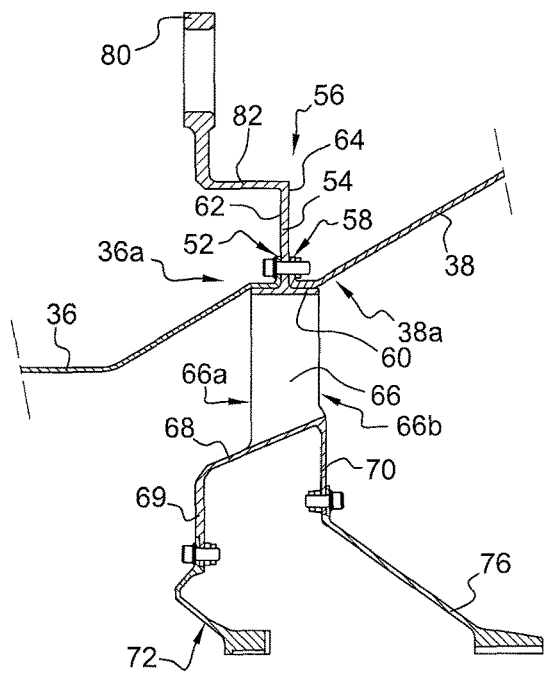
FIG. 4 is a sectional detailed view of the intermediate casing, of the high pressure turbine casing and of the low pressure turbine casing of the turbine of FIGS. 2 and 3.

FIGS. 2 and 3 show a turbine 32 of a turbomachine 34. The turbomachine 34 comprises a combustion chamber 34a opening downstream into a high pressure turbine externally delimited by a high pressure turbine casing 36, here casing 36 HP, then into a low pressure turbine externally delimited by a low pressure turbine casing 38, here casing 38 BP. As illustrated, the downstream end of the combustion chamber casing 40 is attached by an annular flange 42 bolted on an annular flange 50 of the upstream end of the casing 36 HP. The downstream end 36a of the casing 36 HP comprises a radial annular flange 52 attached on a radial annular flange 54 of a structural intermediate casing 56, here intermediate casing 56, inserted between the casing 36 HP and the casing 38 BP (FIG. 4).

The turbine 32 here combines the high pressure turbine and the low pressure turbine.

Like that of the prior art, the turbomachine 34 comprises a fan disc 6 sucking air towards a downstream low pressure compressor 8, followed by a high pressure compressor 10 which opens into the combustion chamber 34a.

The words upstream and downstream refer to the flowing of air in the turbomachine 34, i.e. from left to right in the figures.

As shown in FIG. 4, the intermediate casing 56, the casing 36 HP and the casing 38 BP are coaxial about a longitudinal axis A of the turbomachine 34.

The upstream end 38a of the casing 38 BP comprises a radial annular flange 58 for attaching same to the intermediate casing 56.

The intermediate casing 56 comprises a cylindrical outer annular shroud 60 from which the radial annular flange 54, whereon the radial annular flange 52 of the casing 36 HP and the radial annular flange 58 of the casing 38 BP are attached, radially extends outwards.

More precisely, as shown in FIG. 4, the radial annular flange 52 axially bears in the downstream direction and is attached to an upstream face 62 of the annular flange 54 of the intermediate casing 56 and the radial annular flange 58 bears on and is attached to a downstream face 64 of the annular flange 54 of the intermediate casing 56.

The downstream end 36a of the casing 36 HP and the upstream end 38a of the casing 38 BP radially bear inwards on the outer annular shroud 60 of the intermediate casing 56.

According to an alternative embodiment, not shown, only one of the ends 36a, 38a of the casings 36, 38 could bear on the shroud 60 of the intermediate casing 56, with the other one of the ends 36a 38a then bearing, for instance on a spacer integral with the intermediate casing 56.

The intermediate casing 56 comprises a plurality of arms 66 which extend between an inner annular shroud 68 and the outer annular shroud 60. The shroud 68 is frustoconical with a section increasing in the upstream direction as illustrated in FIG. 4.

Such arms 66 specifically have a structural function but may have an additional function, as is the case here, of straightening the air flow leaving the high pressure turbine prior to the entering thereof into the low pressure turbine. In the case of large size turbines, temperature conditions require an additional cooling system for the arms 66, which increases the mass of the turbomachine. For such large size turbomachines, using the aerodynamic fairing mounted around of the arms 66 to facilitate the air flow will be preferred, with such fairing being so designed as to resist the high temperature of the hot gas of the turbine.

As can be seen in the figures, and more particularly in FIG. 4, the annular flange 54 of the intermediate casing 56 is preferably arranged between the leading edge 66a and the trailing edge 66b of the arms 66.

The intermediate casing 56 also comprises an upstream radial annular wall 69 and a downstream radial annular wall 70 radially formed inside the inner annular shroud 68 and externally connected therewith and respectively carrying inside a bearing 72 for supporting and guiding the shaft 74 of the high pressure turbine and a bearing 76 for supporting and guiding the shaft 78 of the low pressure turbine.

Eventually, the intermediate casing comprises means 80 for fixing the turbine on an aircraft. Such fixing means 80 are connected to the annular flange 54 through an axial wall 82.

Advantageously, the turbomachine 34 is connected to the aircraft through bolts, which provides a reversible, simple and quick mounting of the turbomachine 34 on the aircraft.

Advantageously, the outer annular shroud 60, the inner annular shroud 68, the arms 66, the fixing means 80, the upstream annular wall 68 and the downstream annular wall 70 are made in one single piece, for instance produced in a foundry.

A wheel cover (not shown) surrounding the arms 66 may also be provided in order to limit the disturbances in the air flow created by the arms when the intermediate casing 56 is made in one piece. As a matter of fact, specifically in large size turbomachines, an intermediate casing 56 integrating the wheel covers can hardly be manufactured in a foundry for a reasonable cost.

The invention claimed is:

1. A turbine comprising:
   an intermediate casing axially inserted between an upstream high pressure turbine casing and a downstream low pressure turbine casing; and
   an outer annular shroud from which an annular flange radially extends,
   wherein the downstream end of the high pressure turbine casing and the upstream end of the low pressure turbine casing are attached on the radial annular flange of the intermediate casing, and
   wherein the downstream end of the high pressure turbine casing and/or the upstream end of the low pressure turbine casing radially bears inwards on the outer annular shroud of the intermediate casing.

2. The turbine of claim 1, wherein the downstream end of the high pressure turbine casing comprises a radial annular flange attached on an upstream face of the annular flange of the intermediate casing.

3. The turbine of claim 1, wherein the upstream end of the low pressure turbine casing comprises a radial annular flange attached on a downstream face of the annular flange of the intermediate casing.

4. The turbine of claim 1, wherein the intermediate casing comprises a plurality of arms extending between an inner annular shroud and the outer annular shroud.

5. The turbine of claim 4, wherein the annular flange of the intermediate casing is arranged along the longitudinal axis of the turbine, between the leading edge and the trailing edge of the arms.

6. The turbine of claim 4, wherein the intermediate casing comprises an upstream annular wall and a downstream annular wall radially formed inside the inner annular shroud and externally connected therewith and, respectively carrying a bearing for supporting and guiding the shaft of the high pressure turbine and a bearing for supporting and guiding the shaft of the low pressure turbine.

7. The turbine of claim 1, wherein the intermediate casing comprises means for fixing the turbine to an aircraft.

8. The turbine of claim 4, wherein the outer annular shroud, the inner annular shroud, the arms, the fixing means, the upstream annular wall and the downstream annular wall are produced in one piece, for instance produced in a foundry.

9. The turbine of claim 7, wherein it is fixed to an aircraft by bolting the means for fixing on the aircraft.

10. A turbomachine comprising the turbine of claim 1.

* * * * *